US010581521B2

(12) United States Patent
Shaw et al.

(10) Patent No.: US 10,581,521 B2
(45) Date of Patent: Mar. 3, 2020

(54) DUAL-MODE IMAGING RECEIVER

(71) Applicants: Gary A. Shaw, Westford, MA (US); Lawrence M. Candell, Arlington, MA (US); Pablo I. Hopman, Harvard, MA (US)

(72) Inventors: Gary A. Shaw, Westford, MA (US); Lawrence M. Candell, Arlington, MA (US); Pablo I. Hopman, Harvard, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/117,853

(22) Filed: Aug. 30, 2018

(65) Prior Publication Data

US 2019/0068279 A1 Feb. 28, 2019

Related U.S. Application Data

(60) Provisional application No. 62/551,968, filed on Aug. 30, 2017.

(51) Int. Cl.
*G01T 1/24* (2006.01)
*H04B 10/60* (2013.01)
(Continued)

(52) U.S. Cl.
CPC ............... *H04B 10/11* (2013.01); *G01T 1/24* (2013.01); *H04B 10/60* (2013.01);
(Continued)

(58) Field of Classification Search
CPC .... H04B 10/11; H04B 10/60; H04B 10/1121; H04N 5/2258; H04N 5/2259;
(Continued)

(56) References Cited

U.S. PATENT DOCUMENTS 8,179,296 B2   5/2012   Kelly et al.
8,301,027 B2   10/2012  Shaw et al.
(Continued)

FOREIGN PATENT DOCUMENTS

WO   2015148604 A1   10/2015

OTHER PUBLICATIONS

Frechette et al., "Readout circuitry for continuous high-rate photon detection with arrays of InP Geiger-mode avalanche photodiodes," Proc. SPIE (vol. 8375, pp. 83750W-1), 9 pages, May 22, 2012.
(Continued)

*Primary Examiner* — Dalzid E Singh
(74) *Attorney, Agent, or Firm* — Smith Baluch LLP

(57) ABSTRACT

A dual-mode imaging receiver (DMIR) can acquire and maintain SOA free-space optical communication (FSOC) links without a precision mechanical gimbal. Unlike other FSOC technologies, a DMIR can operate without precise spatial alignment and calibration of the transmitter's or receiver's spatial encoders (precision pointing) in static (fixed point to point) geometries. Instead, a DMIR uses electronic receive beam selection to acquire and track transmitters with coarse mechanical pointing and a single aperture. And because the DMIR can operate with just one aperture, it does not need a beacon at the transmitter since it does not transition from a wide field-of-view acquisition aperture to a narrow field-of-view detection and decoding aperture even in dynamic geometries.

18 Claims, 10 Drawing Sheets

(51) Int. Cl.
*H04N 5/225* (2006.01)
*H04N 5/341* (2011.01)
*H04N 7/22* (2006.01)
*G01J 1/44* (2006.01)
*H04B 10/112* (2013.01)
*H04B 10/11* (2013.01)
*H04N 5/3745* (2011.01)

(52) U.S. Cl.
CPC ......... *H04N 5/2258* (2013.01); *H04N 5/2259* (2013.01); *H04N 5/3415* (2013.01); *H04N 5/37455* (2013.01); *H04N 7/22* (2013.01); *G01J 2001/442* (2013.01); *H04B 10/1121* (2013.01)

(58) Field of Classification Search
CPC .... H04N 5/3415; H04N 5/37455; H04N 7/22; G01T 1/24; G01J 2001/442
USPC .......................................................... 398/18
See application file for complete search history.

(56) References Cited

U.S. PATENT DOCUMENTS

| | | | |
|---|---|---|---|
| 8,605,853 | B2 | 12/2013 | Schultz et al. |
| 8,692,176 | B2 | 4/2014 | Kelly et al. |
| 8,933,832 | B2 | 1/2015 | Kelly et al. |
| 9,159,446 | B2 | 10/2015 | Schultz et al. |
| 9,270,895 | B2 | 2/2016 | Kelly et al. |
| 9,385,738 | B2 | 7/2016 | Kelly et al. |
| 9,491,389 | B2 | 11/2016 | Kelly et al. |
| 9,615,038 | B2 | 4/2017 | Kelly et al. |
| 9,712,771 | B2 | 7/2017 | Kelly et al. |
| 9,743,024 | B2 | 8/2017 | Tyrrell et al. |
| 9,768,785 | B2 | 9/2017 | Schultz et al. |
| 9,866,770 | B2 | 1/2018 | Colonero et al. |
| 10,142,567 | B2 | 11/2018 | Colonero et al. |
| 2010/0060622 | A1* | 3/2010 | Van der Spiegel .. H04N 5/3575 345/211 |
| 2010/0271525 | A1* | 10/2010 | Takahashi ............... H03M 1/14 348/308 |
| 2015/0163429 | A1 | 6/2015 | Dai et al. |
| 2016/0057366 | A1 | 2/2016 | Lee et al. |
| 2017/0026603 | A1 | 1/2017 | Kelly et al. |
| 2017/0176250 | A1* | 6/2017 | Rae ................... H01L 27/14609 |
| 2017/0208274 | A1 | 7/2017 | Kelly et al. |
| 2017/0366754 | A1* | 12/2017 | Feng .................. H04N 5/23245 |
| 2017/0366763 | A1 | 12/2017 | Lin et al. |
| 2018/0035067 | A1 | 2/2018 | Tyrrell et al. |
| 2018/0160068 | A1 | 6/2018 | Kelly et al. |
| 2018/0184024 | A1 | 6/2018 | Colonero et al. |

OTHER PUBLICATIONS

Gregory et al., "High Efficiency Counting and Timing Readout Integrated Circuit for Geiger-mode Avalanche Photodiodes," MSS Active-EO Conference, Session AA13, Sep. 12, 2017.
International Search Report and Written Opinion in PCT/US2018/048855 dated Oct. 30, 2018. 16 pages.
Kansky et al., "High efficiency coherent beam combining of semiconductor optical amplifiers," Optics Letters, vol. 37, No. 23, Dec. 1, 2012.
Lane, "Control of a MEMS fast steering mirror for laser applications," MS Thesis, Massachusetts Institute of Technology, Jun. 2012. 79 pages.
Liau et al., "Large-numerical-aperture InP lenslets by mass transport", Appl. Phys. Lett. 52, 1859, 1988.
Robinson et al., "1.5-photons/bit Photon-Counting Optical Communications Using Geiger-Mode Avalanche Photodiodes," IEEE LEOS Newsletter, Oct 2005. 2 pages.
Stoppa et al., A 32×32-pixel array with in-pixel photon counting and arrival time measurement in the analog domain. Procedings of IEEE, 204-207. 2009.
Sun et al., "Large-scale nanophotonic phased array," Nature 493, 195-199, Jan. 10, 2013.
Verghese et al., "Arrays of InP-based avalanche photodiodes for photon counting," IEEE J. Sel. Top. Quant. Elec., 13(4), pp. 870-886 (2007).
Yamashita et al., "The new tracking control system for Free-Space Optical Communications," 2011 International Conference on Space Optical Systems and Applications, pp. 122-131.
Yang et al., "Ultralow threshold current vertical-cavity surface-emitting lasers obtained with selective oxidation," Electronic Letters, vol. 31, No. 11, pp. 886-888, 1995.

* cited by examiner

DUAL-MODE IMAGING RECEIVER

CROSS-REFERENCE TO RELATED APPLICATION(S)

This application claims the priority benefit, under 35 U.S.C. § 119(e), of U.S. Application No. 62/551,968, entitled "Dual Mode Imaging Receiver," which was filed on Aug. 30, 2017, and is incorporated herein by reference in its entirety.

GOVERNMENT SUPPORT

This invention was made with Government support under Contract No. FA8721-05-D-0001 awarded by the U.S. Air Force. The Government has certain rights in the invention.

BACKGROUND

State-of-the-art (SOA) optical communication link efficiencies are bumping against the theoretical limits of channel capacity, with more than one demonstration of links transferring data reliably at an average rate of several bits per detected photon. However, despite the great strides in link efficiency, conventional receiver pointing, acquisition, and tracking (PAT) implementations are often complex, and the size weight and power (SWaP) of PAT subsystems is often a barrier to adoption of optical communication in SWaP-constrained systems. A major reason PAT is so challenging is that the detectors must have narrow fields of view, typically 1 mrad or less, to suppress background illumination. At the same time, initial acquisition of a beacon or optical communication transmitter may require searching a solid angle that spans several degrees or more.

The diametrically opposed requirements of a narrow field of view (NFOV) for detection and decoding of communication data and wide field of view (WFOV) for acquisition are typically satisfied by precision mechanical scanning the NFOV detector, guided by a WFOV acquisition detector (e.g., a quad cell). The handoff from WFOV detection to NFOV acquisition and tracking increases the latency in establishing a communication link. It also significantly increases the SWaP, cost, and complexity of the receiver, often eliminating free-space optical communications from consideration for SWaP-constrained systems.

SUMMARY

A dual-mode imaging receiver (DMIR) can reduce or eliminate the reliance on precision mechanical gimbals to acquire and maintain SOA free-space optical communication (FSOC) links. Unlike other FSOC technologies, a DMIR does not require precise spatial alignment and calibration of spatial encoders (precision pointing) of either the transmitter or receiver in static (fixed point to point) geometries. Instead, a DMIR employs electronic receive beam selection to acquire and track static or mobile transmitters without the need for precision mechanical pointing. A DMIR can also eliminate the need for a beacon at the transmitter since there is no need to transition from a WFOV acquisition sensor to a NFOV detection and decoding sensor even in dynamic geometries.

Moreover, a DMIR can be small, light, and consume less power than a mechanically steered receiver. It can be mass-produced by itself or as part of unit that includes an electronically steerable transmitter, such as the agile beam laser array transmitter in U.S. Pat. No. 8,301,027, which is incorporated herein by reference in its entirety. Combining a DMIR with an agile beam laser array transmitter yields a gimbal-less FSOC transceiver that can electronically steer multiple independent laser beams and detect and acquire multiple simultaneous optical communication signals over a large solid angle (e.g., 0.047 steradians or 14 degrees), enabling simultaneous detection and tracking of multiple independent optical communications sources through a single aperture.

A DMIR may include a focal plane array that comprises an array of photodetectors (e.g., an array of single-photon detectors, such as GmAPDs) and is operably coupled to a read-out integrated circuit. The read-out integrated circuit contains. At least one pixel per photodetector in the array of photodetectors. Each pixel in the read-out integrated circuit can be switched independently between a photon-counting mode and a photon-timing mode.

The read-out integrated circuit can synchronously read pixels in the photon-counting mode and asynchronously read each pixel in the photon-timing mode.

Each pixel in the read-out integrated circuit comprises a counter to count photons in the photon-counting mode and to track photon arrivals in the photon-timing mode. The counter may be an up/down counter, in which case the read-out integrated circuit can modulate a counting direction of the up/down counter with an up/down modulation signal based on a time-domain structure of a communication waveform detected by the pixel. And the read-out integrated circuit can vary a relative phase between the up/down modulation signal and the communication waveform.

The DMIR may also include a first clock and a second clock, each of which is on or operably coupled to the read-out integrated circuit. The first clock clocks read-out of each pixel in the photon-counting mode at a first rate, and the second clock clocks each pixel in the photon-timing mode at a second rate greater than the first rate. The first rate may be from 1 kHz to 10 kHz and the second rate is from 100 kHz to 10 MHz The DMIR may also include a processor that is operably coupled to the read-out integrated circuit. In operation, the processor generates an image of a scene based on outputs from the pixels in the photon-counting mode.

The DMIR can be used for imaging and communicating as follows. It can detect photons with a first photodetector in the array of photodetectors and count the photons detected by the first photodetector with a first pixel in the read-out integrated circuit. At the same time, it can detect photons with a second photodetector in the array of photodetectors and time arrivals of the photons detected by the second photodetector with a second pixel in the read-out integrated circuit. These photon arrivals represent a communications signal.

Unlike other FSOC receivers, the DMIR can receive the photons detected by the first and second photodetectors via the same aperture. The DMIR can also switch the first pixel from photon-counting mode to photon-timing mode independent of the second pixel's operating mode.

As mentioned above, the second pixel can time arrivals of the photons by incrementing a count in an up/down counter. The read-out integrated circuit may modulate a counting direction of the up/down counter with an up/down modulation signal based on a time-domain structure of a communication waveform detected by the second pixel. It may also vary a relative phase between the up/down modulation signal and the communication waveform.

The DMIR may also operate by synchronously reading a counter in the first pixel and asynchronously reading a counter in the second pixel. It can clock read-out of the first pixel at a first rate and clock the second pixel at a second rate greater than the first rate. The first rate can be from 1 kHz to 10 kHz and the second rate can be from 100 kHz to 10 MHz. It can also generate an image of a scene based on the photons outputs from the pixels in the photon-counting mode.

In addition, the DMIR can detect many communications signals simultaneously. For instance, the DMIR may detecting photons with a third photodetector in the array of photodetectors It can time arrivals of the photons detected by the third photodetector with a third pixel in the read-out integrated circuit while the first pixel counts the photons detected by the first photodetector and the second pixel times arrivals of the photons detected by the second photodetector. The arrivals timed by the third photodetector represent another communications signal.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1B:
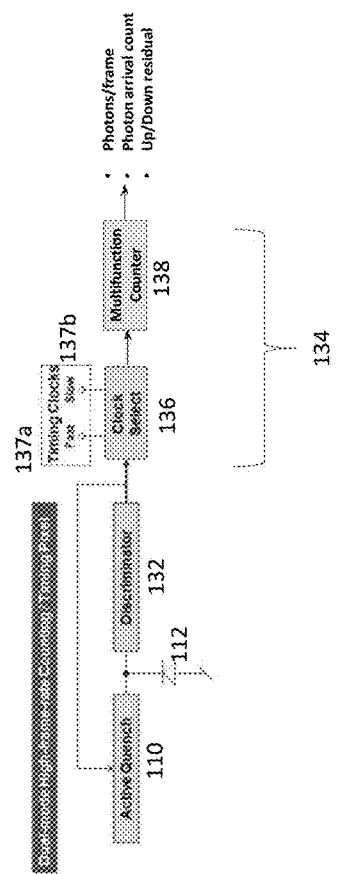
FIG. 1B shows a block diagram of logic and control elements comprising each pixel in the DMIR of FIG. 1A.

A dual-mode imaging receiver (DMIR) includes a focal plane array (FPA) and read-out integrated circuit (ROIC) enabling individual pixels to be switched between imaging and communications modes. The ROIC detects, demodulates, and reads data at each pixel with an off-chip bandwidth proportional to the number of pixels receiving active communication signals rather than the total number of pixels in the FPA. Each pixel operates independently, so the DMIR can simultaneously detect many communications signals from different angle in wide area field of view. As the signal sources move with respect to the DMIR, the signals are picked up by different pixels in the DMIR, eliminating the need for precision steering or scanning of the DMIR. This makes the DMIR smaller, lighter, and less power hungry than a conventional narrow-beam free-space optical communications receiver with a precision gimbal for pointing, acquisition, and tracking. The DMIR can be integrated with an agile-beam laser array transmitter in a monolithic package for all-electronic beam steering and receiving.

A DMIR can support multiple, concurrent free-space optical communication channels with one FPA and receive aperture. Augmented with a beacon interrogator or communication transmitter, it can control the communication rate of each channel, concurrently detecting and demodulating the signals from multiple spatially diverse sources, compensating for motion, and transferring the demodulated data off of the FPA. In addition to detecting, acquiring, and tracking multiple spatially diverse communication signals, a DMIR can also concurrently produce an image of the scene within the field of view providing context for the location and environment of the communication sources.

A DMIR has several unique features for simultaneous imaging and communication. To start, the detection and demodulation of the data received from a given transmitter occurs independently at each pixel in the DMIR's FPA. Each pixel can discriminate between the presence of a valid communication signal and background noise or hot spots in the image. And since each pixel acts as an independent receiver, the DMIR can also be used to detect, acquire and demodulate the communication signals from multiple independently modulated active transmitters through a single aperture.

The DMIR enables a single aperture and detector array to support communication links from spatially diverse, concurrent users. Pixels that are not illuminated by a communication signal can be programmed to perform conventional imaging through the aperture by integrating the signal from the scene. The ROIC may then read out the integrated signal values at a much lower data rate than the communication signals, with some attendant reduction in the maximum aggregate communication rate that can be transferred off chip.

When employed exclusively for detection, acquisition, tracking and demodulation of communication signals, the DMIR's ROIC may read data from only those pixels illuminated by communication signals. Put differently, the ROIC may dedicate all of its readout bandwidth to reading communications signals. This allows much higher aggregate communication rates than possible if the ROIC reads signals from every pixel in the FPA at each frame as in conventional focal plane imagers.

Advantages of Dual-Mode Imaging Receivers (DMIRs)

DMIRs offer both system-level and device-level advantages for free-space optical communications. At the system level, they reduce or eliminate the need for scheduling access to the communication channel that affects conventional multiuser communication systems, such as Ethernet cable, fiber, and time- or wavelength-division multiple-access (TDMA or WDMA) free-space systems. In a conventional multiuser communication system, channel contention usually limits the number of users by forcing users to contend for and acquire the channel through one of many possible protocols. With a DMIR space-division multichannel communication system, the number of simultaneous users is primarily constrained by the readout rate and field of view of the FPA, with multi-user channel access enabled by spatial diversity. The read-out rate scales with the number of communicators rather than the number of pixels in the FPA. A DMIR can accommodate real-time adaptation of the signal rate by sending rate control requests to the individual communicators via a low-rate beacon interrogator, enabling the system to adjust to a wide variation in the number of users while sustaining high aggregate data transfer rates.

Furthermore, so long as the FPA can spatially resolve each user, the users transmit without co-channel interference or collision, even if the users are in a very small area. As a result, a DMIR-based system can support thousands of densely-packed, concurrent users, each with data rates of tens of kilobits per second on a non-interfering basis. (Alternatively, a DMIR can support a smaller number of users transmitting at data rates of many Mbps, constrained only by the aggregate readout rate of the ROIC.) Moreover, the users can communicate with the DMIR without complex channel access protocols. This means that the individual user nodes can be small, simple, and inexpensive.

Dual-Mode Imaging Receiver (DMIR) Architecture

Figure 1A:
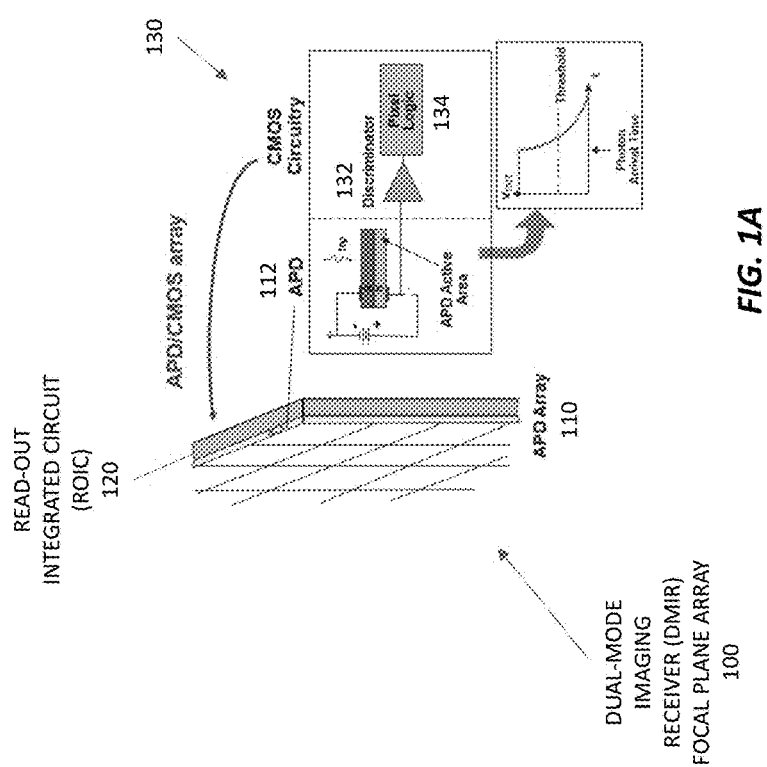
FIG. 1A illustrates a dual-mode imaging receiver (DMIR).

FIGS. 1A and 1B show an example DMIR 100 and a pixel 130 the DMIR. The DMIR 100 includes a focal plane array (FPA) 100 of avalanche photodiodes (APDs) 112 operating in Geiger mode (Gm) and a custom readout integrated circuit (ROIC) 120. If desired, the FPA 110 can be mated to a gallium phosphide (GaP) microlens array (not shown) that compensates for the low fill factor of the APDs relative to the pitch of the FPA 110.

The GmAPD FPA 110 is designed to operate near-room-temperature and with a peak wavelength response of approximately 1 μm. In Geiger mode, the APDs 112 are biased into a meta-stable state in which a single photon can initiate an avalanche breakdown capable of being detected with standard digital CMOS integrated circuits. In response to detecting a photon, the APD 112 emits a voltage that is constant for a brief period and then drops exponentially. This photon detection technique is referred to as "photon-to-digital conversion" because detected photons are converted directly to logical bits in the ROIC 120. Compared to ultra-sensitive light detection techniques that require either cryogenic cooling of the detectors or low-noise amplifiers in the electronics, GmAPDs 112 offer low-power, simple, single-photon detection. Because of these characteristics of GmAPD photo-detection, low size, weight, and power (SWaP) imagers with large format (e.g., kilopixel to megapixel) FPAs 110 can be fabricated.

The ROIC 120 coupled to the FPA 110 performs high-efficiency counting and timing. In this example, it is a 256×256 format ROIC with a pixel circuit laid out in a 25 μm square in an architecture that should allow scaling to megapixel class FPAs 100. (Other formats are also possible.) The ROIC 120 is divided into pixels 130, each of which is mated to a corresponding APD 112 in the FPA 110. The ROIC 120 may include one pixel 130 per APD 112 in the FPA 110. If desired, detector pixel down-sampling can be used to mitigate optical crosstalk between neighboring APDs 112.

Each pixel 130 includes a discriminator 132 coupled to the corresponding APD 112 and pixel logic 134 coupled to the discriminator 132. FIG. 1B shows that this pixel logic 134 includes clock selection circuit 136 that switches between a fast clock 137a and a slow clock 137b located elsewhere on or coupled to the ROIC 130. The fast clock 137a is used to time stamp photon arrival times in pixels 130 in photon-timing mode for detecting communication signals. The slow clock 137b sets the frame integration time for pixels 130 detecting background (image) signals. Any given pixel 130 can be programmed to act as an imaging pixel by counting photons arriving in a frame time or to act as a communication pixel by time-stamping and reporting the time of arrival of a single photon.

In addition, each pixel 130 includes a multifunction counter 138 can be programmed to perform up/down counting for detecting the presence of a communicator. The multifunction counter 138 can be implemented as two 8-bit counters with some control logic. In photon-counting mode, the 8-bit counters are ping-ponged to allow a frame to be read out while a new frame is accumulated. If the pixel 130 is in photon-timing mode, the two 8-bit counters are connected in series to provide a 16-bit counter providing sufficient dynamic range to subdivide the time into nanosecond intervals ($1/(8\text{ kHz} \times 2^{16}) \approx 2$ ns). Up-down counting during a frame uses less dynamic range than imaging and can be accomplished with an 8-bit counter.

Depending upon how quickly a new communicator appearing in the field of view should be detected, occasional photon-counting frames can be devoted instead to up-down counting in order to detect the presence of a communicator and assign the appropriate pixels to perform photon time-of-arrival rather than photon counting. Most pixels 130 in the DMIR 100 operate in a low-frame-rate photon-counting mode in which the in-pixel counter 138 accumulates a count for each photon arrival and reports intensity at the frame rate, which is selectable between 1-10 kHz and is set by the first clock. Pixels 130 in photon-timing mode operate asynchronously with independent arming at a refresh rate of about 1 MHz. This refresh rate is referenced to the fast clock 137a. Each pixel 130 in photon-timing mode records the time of arrival of each photon detection by establishing how many fast clock ticks (periods) have occurred since the start of the frame. In this fashion, a 16-bit counter and 8 kHz frame rate can achieve timing resolutions of about 12 ns. Using a Vernier counter can yield even higher time precision.

A DMIR Camera

Figure 2B:
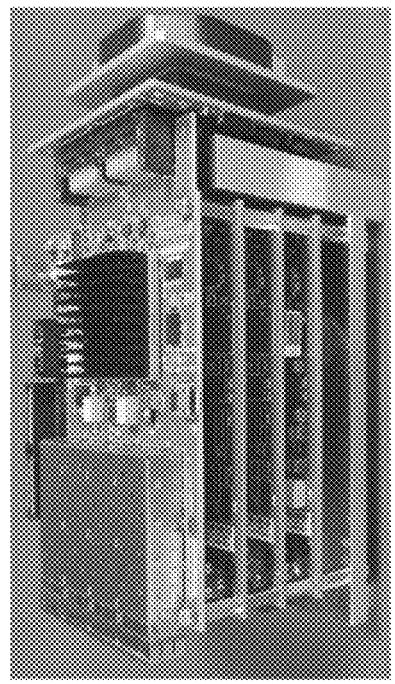
FIG. 2B is a photograph of the digital processing and control hardware the DMIR camera of FIG. 2A.
Figure 2A:
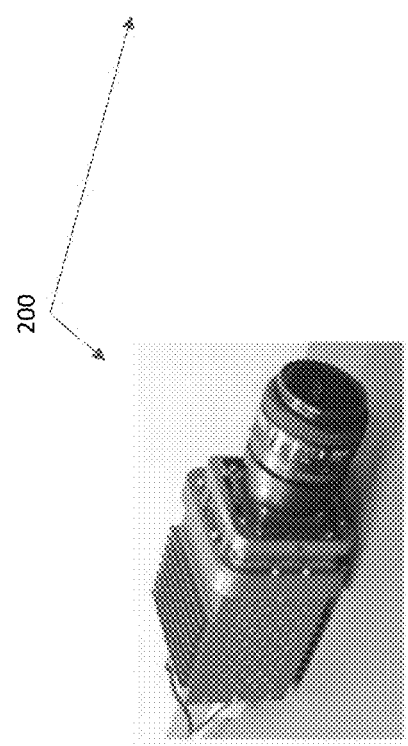
FIG. 2A is a photograph of a DMIR camera.
Figure 2C:
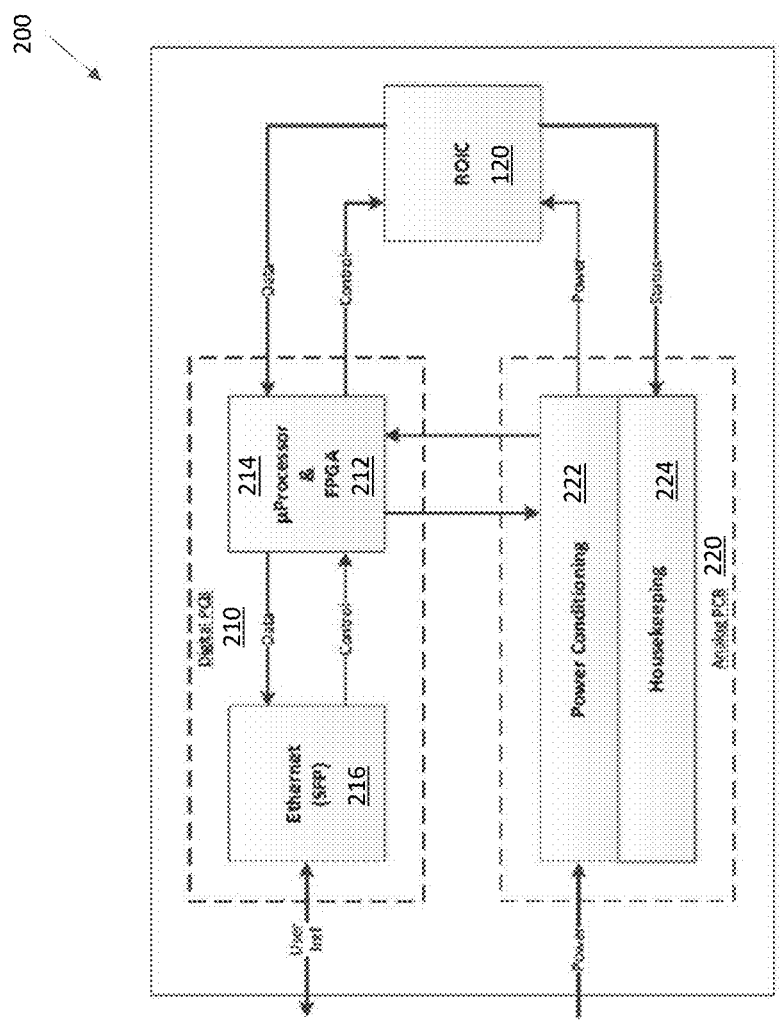
FIG. 2C is a block diagram of modules in the DMIR camera of FIG. 2A.

FIGS. 2A-2D illustrate a DMIR 100 packaged with a lens and the associated electronics and functions in a DMIR camera 200. FIG. 2A is a photograph of the DMIR camera 200 showing the housing, which accepts a standard Nikon lens on the front that can be changed depending on the scenario. FIG. 2B shows the printed circuit boards (PCBs) inside the housing. These PCBs include a digital PCB 210 and an analog PCB 220 as shown in FIG. 2C.

The digital PCB 210 hosts a reconfigurable field-programmable gate array (FPGA) 212 that controls the camera and external interfaces between the ROIC 120 and an external computer (not shown). The FPGA 212 connects to the external computer via a microprocessor 214 and an ethernet interface 216. The analog PCB 220 includes power conditioning electronics 222 and housekeeping electronics 224 for the ROIC 120 and digital electronics, including the FPGA 212 and microprocessor 214.

The DMIR camera 200 is a self-contained unit that allows easy external interfaces for an end user: 12V power and Ethernet. Internally, the power conditioning electronics 222 takes in 12V, produces all required voltages in the correct sequence, and the housekeeping electronics 224 perform the housekeeping for the camera 224. The FPGA 212 contains a soft embedded processor and functions as the main controller for the camera 200. It performs the interfacing and control for the ROIC 120. The FPGA 212 also interfaces to an end-user computer via Ethernet, using one of four Small Form-Factor Pluggable (SFP) connections, which enables a simple bridge to a WiFi connection.

Figure 2D:
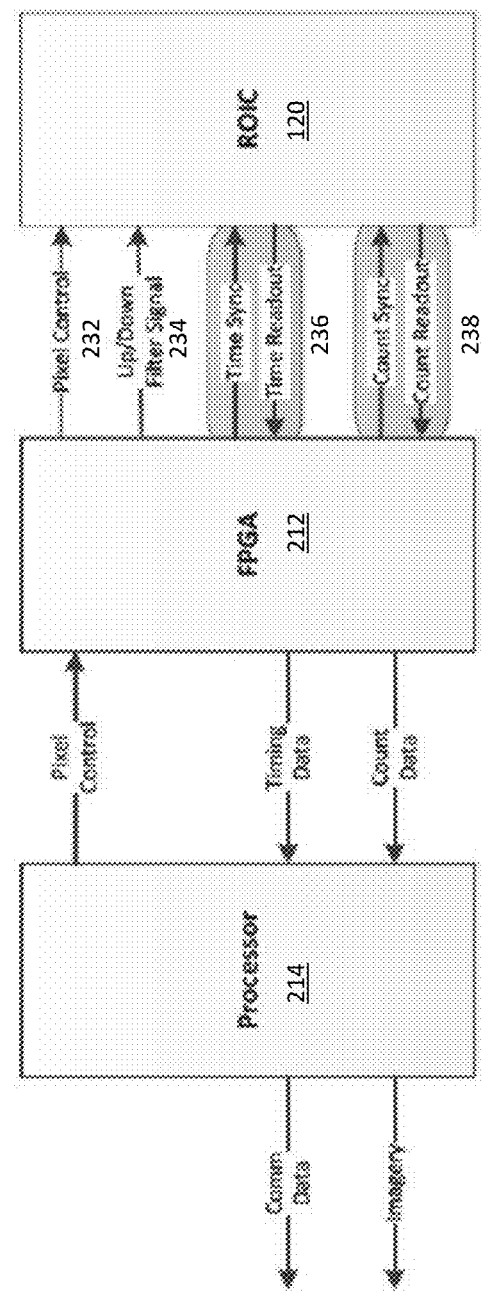
FIG. 2D is a block diagram of control and data interfaces in the DMIR camera of FIG. 2A.

FIG. 2D shows the DMIR's main interfaces for processing and control, including a pixel control bus 232, up/down filter signal interface 234, timing interface 236, and count interface 238 between the FPGA 212 and the ROIC 120. The FPGA 212 generates the real-time signals, while the processor 214 performs all the image and digital signal processing in the DMIR camera 200.

The pixel control bus 232 is used to configure the mode of operation for each pixel in the ROIC 120. Each pixel's mode can be switched on every counting frame boundary between disabled, photon-counting mode, photon time-tagging mode (described in greater detail below), or up-down counting. Other pixel modes can be defined within the constraints of the pixel logic, and each pixel mode can be set independently. Since the ROIC 120 provides the ability to readout counting frames at 8 kHz, the mode of each pixel 130 can be switched every 125 microseconds. (Other frame rates are also possible.)

As mentioned above, each pixel 130 in the ROIC 120 contains an 8-bit counter 138 for counting the number of photons detected by a corresponding APD 112. The FPGA 212 pulses the count sync signal via the count interface 236 to begin the digital transfer and readout of the count values from the pixels 130 in photon-counting mode. A second 8-bit counter enables photon counting for the next image frame while the previous frame count is being read out. These count values can be interpreted as a standard intensity image for the focal plane. The pixel image frames are non-uniformity corrected and displayed in an image viewer.

The microprocessor 214 generates imagery by correcting and stacking consecutive 125-microsecond integration frames from the ROIC 120. Since the readout is entirely digital, no read noise is added when digitally stacking the frames. The zero read-noise penalty enables the DMIR 100 to generate arbitrary length integration frames to improve contrast in high dynamic range scenes.

Photon-Counting Mode and Photon-Timing Mode

Figure 3:
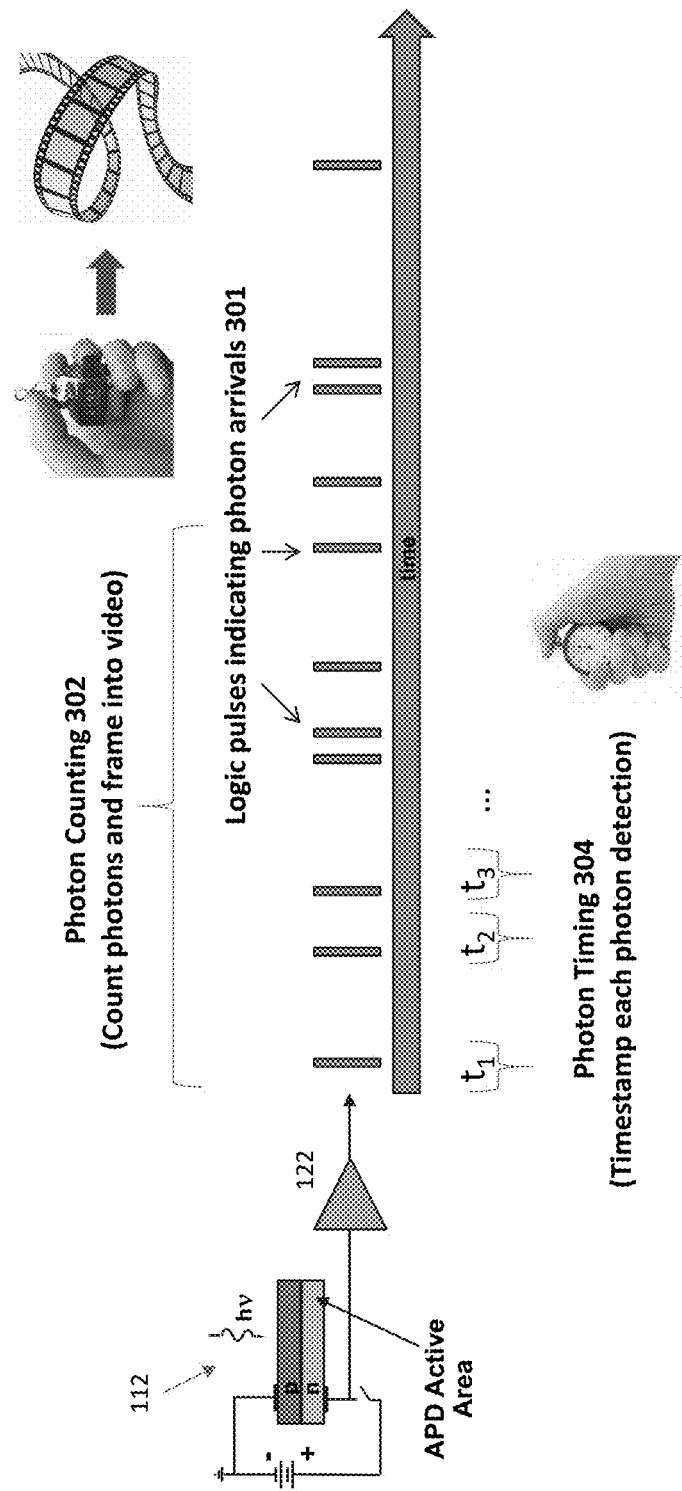
FIG. 3 illustrates two modes of operation for a pixel: Photon-counting and photon time-tagging a series of logic pulses generated by a Geiger-mode avalanche photodiode (GmAPD) in the DMIR in response to incident photons.

FIG. 3 illustrates a stream of logic pulses 301 emitted by an APD 112 in response to a stream of incident photons. Each logic pulse in the stream 301 represents detection of a photon by the APD 112. In photon-counting mode, the multifunction counter 138 is programmed to count the number of logic pulses (photon detections) during a slow clock period 302 (i.e., the period equal to the reciprocal of the slow clock rate). For a slow clock rate of 1-10 kHz, the slow clock period 302 is 0.1-1.0 ms. At the end of each slow clock period 302, the ROIC 120 reads the value counted by the first counter 138 and uses it to generate an image of the scene monitored by the DMIR 100. During the reading of the 8-bit counter, a second 8-bit counter is employed to count photons in the new frame. The per-pixel digitization allows high frame rates (e.g., kHz frame rates) and noiseless readout, making it possible to stack images without a read noise penalty. If desired, the integration period can be extended with off-chip motion compensation in order to achieve frame-to-frame image registration.

Each pixel 130 can also operate in a photon-timing mode, also called photon time-stamping mode or photon time-tagging mode. In the photon-timing mode, the two 8-bit counters can be reconfigured to function as a 16-bit counter which, when driven by the fast clock 137a, enables precise timing of when the APD 112 detects a photon arrival. The fast clock period 304 is orders of magnitude shorter than the slow clock period 302 (e.g., 10 ns versus 1 ms).

Each pixel 130 can be switched independently between photon time-stamping or time-tagging mode and photon-counting mode. If desired, a group of adjacent pixels (e.g., a 3×3 group) can be switched together into photon time-stamping mode. Under a lens or set of microlenses, this group of pixels becomes an independent receiver under a miniature telescope with a field of view that is narrow, but still wide enough to account for relative motion of the transmitter and receiver. The narrow field of view serves as a spatial filter that limits the amount of background light (e.g., sunlight) collected with the signal.

Taken together, the pixels 130 are an array of independent receivers that cover a wide field of view without the need for a precision gimbal. In photon-counting mode, they operate with relatively high frame rates. Digital frame addition enables low-light imaging and scenes with wide dynamic range. And noise-less read-out enables high frame rate motion compensation. In photon time-tagging mode, the pixels 130 enable optical communication at power levels within 2-3 dB of theoretical limits. In up-down counting mode the pixels 130 support detection of optical communication sources and rejection of scene illumination and motion artifacts.

Thanks to dual-mode operation (i.e., photon counting and photon timing tagging), the DMIR 100 can generate a context image to locate and validate sources within the field of view. The up-down counting mode enables smart-pixel identification of communicators with reconfigurable regions of interest to time-tag and track communications signals without over-burdening chip input/output or off-chip processing.

Up-Down Counting in Photon-Timing Mode for High-Pass Filtering

The multifunction counter 138 in each pixel 130 can be programmed as a high-speed up-down counter, which acts as a differentiator effecting implementing a simple high-pass filter. This high-pass filter blocks low-frequency modulations from clutter, such as scene lighting changes and receiver motion, passing only the high temporal frequency modulations associated with the communication signals of interest. In one embodiment, the high-pass filter passes a resonant response commensurate with the modulation rate of the communication signal. If a pixel contains only the slow variations associated with scene data and motion artifacts, the high-pass filter produces a small residual output of approximately zero. However, within a pixel or group of pixels, the fast modulations associated with a pulsed communication signal produce a non-zero output from the high-pass filter allowing reliable detection of the communication signal within the frame time of the imager.

To search for a new communicator in the field of view, the ROIC 120 switches the multifunction counter 138 in pixels 130 from photon-counting mode to up/down counting mode 404 based on the carrier frequency or structure of the digital symbols expected from the transmitter at the other end of the free-space optical communications link. For example, every Nth photon counting frame can be devoted to up-down counting to identify any new communicators in the field of view. How often this occurs depends on how quickly one needs to identify a new communicator. For example, at 1 kfps (1 ms frame time) a new communicator could be detected in about 0.1 seconds by assigning every 100th frame to up-down counting.

The counting direction determines whether or not an incoming photon will add or subtract one from the current count in the up/down counter 138b. By matching the up/down counting direction to the time-domain structure of the communication waveform, the ROIC 120 can perform signal detection simply and directly in each pixel 130. Since the phase of the transmitters is not known ahead of time, the filter signal can be walked across all possible phases to detect a communicator regardless of phase. Once a communicator is detected, slot and symbol recovery are performed, and the timing is synchronized to the particular period and phase of the communicator.

Figure 4A:
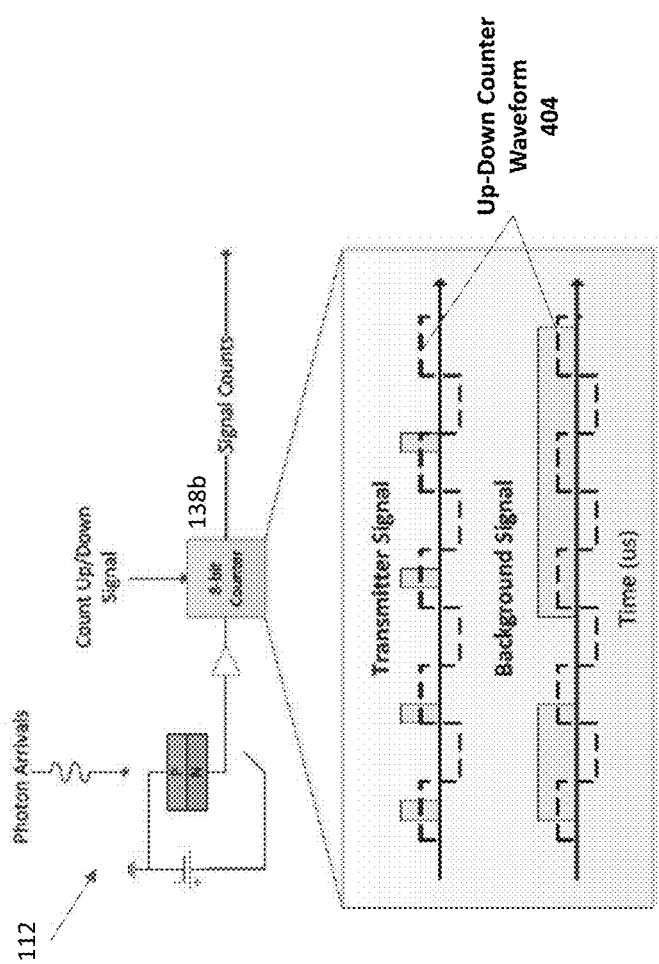
FIGS. 4A and 4B illustrate up/down modulation of detected signals in a DMIR pixel operating for discriminating communication signals from other clutter and background signals.

FIG. 4A shows an example of the up/down filtering in a pixel 130 in photon-timing mode. The two plots show the time arrival of photons at the APD 112 superimposed over the filter signal waveform. The top "transmitter signal" plot illustrates photons arriving in the same phase of the count waveform and are therefore coherently added to the count by the counter 138. The bottom "background signal" plot illustrates a pixel 130 whose photon arrivals are not matched to the count waveform and therefore tend to average to zero. A pixel 130 whose up/down counts diverge from zero are recognized as transmitters, whereas pixels 130 whose counts average toward zero are recognized as background and assigned the task of photon-counting rather than photon-timing.

The FPGA 212 detects pixels 130 of interest by reading out the up/down count frames. It uses the pixel control bus 232 to switch a pixel region of interest (ROI) from photon-counting mode to photon-timing mode. The ROI is centered on a pixel 130 whose up/down count value exceed a threshold. This threshold is determined by the minimum signal level at which the communication system can operate effectively.

Figure 4B:
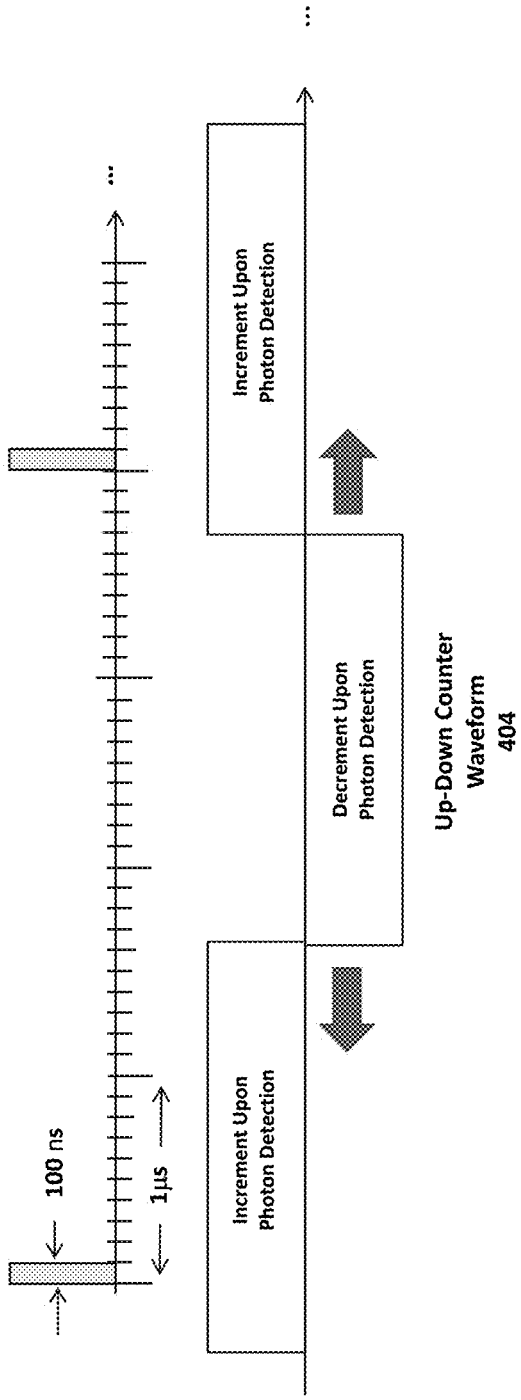

FIG. 4B shows photons detected by a pixel in photon-counting mode at different time slots in successive timing frames. The large horizontal arrows indicate how the phase of the up/down counter waveform can be shifted or varied with respect to the signal waveform 302 for acquiring the signal waveform as described above.

When a pixel 130 is in photon-timing mode, the ROIC 120 assigns a 16-bit time stamp to each photon that arrives in each pixel 130. The photon-timing pixels 130 are read at the minimum time between the transmitter's communication pulses. A value of 0xFF signifies no photon is detected during the current timing frame, while any other value signifies the clock tick at which a photon was detected. Once the 16-bit values have been read off the ROIC 120, the FPGA 212 extends these timestamps to a 64-bit value to give an absolute time to every photon arrival within the frame.

Figure 5:
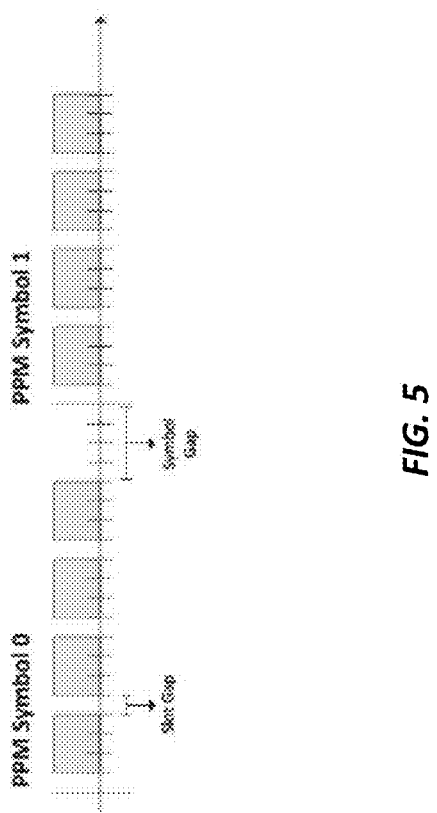
FIG. 5 shows an example 4-ary pulse position modulation (PPM-4) symbol structure for communicating with a DMIR.

FIG. 5 shows an example 4-ary pulse position modulation (PPM) symbol structure. The individual tick marks on the timeline illustrate the time resolution of the ROIC 120. The first four rectangles in Symbol 0 illustrate the slot position in the symbol, followed by an inter-symbol gap, then the beginning of the next symbol. The inter-symbol gap provides an energy efficient mechanism for determining the boundaries between symbols. By histogramming the arrival of photons modulo the symbol time, a correlator can be used to determine the symbol frames.

Once the DMIR 100 has recovered the symbol timing utilizing the inter-symbol gap, it tracks the transmitter's timing using the gap between each slot. In each laser pulse, the transmitter underfills each transmission slot such that there is a small gap at the beginning and end. The DMIR 100 can track as energy begins to spill into the early or late part of the slot and make the necessary timing correction. By using an underfilled transmission slot, every pulse the transmitter sends provides information about the timing offset between the transmitter and receiver. This is in contrast to using the inter-symbol gap, which only provides timing information when the transmitter pulse is in the first or last slot of the symbol. Other methods, such as sync slots, could be used instead. Sync slots may be implemented in a more bandwidth-efficient manner, but at the expense of energy efficiency.

In each photon-timing pixel ROI, the pixels 130 contributing to the signal can be determined through correlated arrivals and those contributing to the in-phase signal counts. With the signal levels contributed by each pixel 130 known, the transmitter's centroid can be calculated. As the transmitter moves away from the center of the current timing ROI, the FPGA 212 and/or microprocessor 214 can update the photon-timing ROI to track the new location of the transmitter on the ROIC 120. The spatial tracking can be done losslessly since the ROIC 120 provides the ability to dynamically enable a new timing set every 125 microseconds.

Applications of Dual-Mode Imaging Receivers

A DMIR here can be viewed as an array of receivers in which each receiver (pixel) is pointed in a slightly different direction. Together, the array of receivers covers a solid angle defining the field of view. It can be used with an electronically steering laser transmit array as part of a bidirectional, wide-field-of-view laser communication transceiver with no moving parts. There are many applications for such a system, including those in which only a subset of the pixels on a focal plane are of interest. The data received by these pixels can be analog data or multi-bit digital data, including modulated optical signals from a transmitter in a free-space optical communications link as described in greater detail below.

Figure 6:
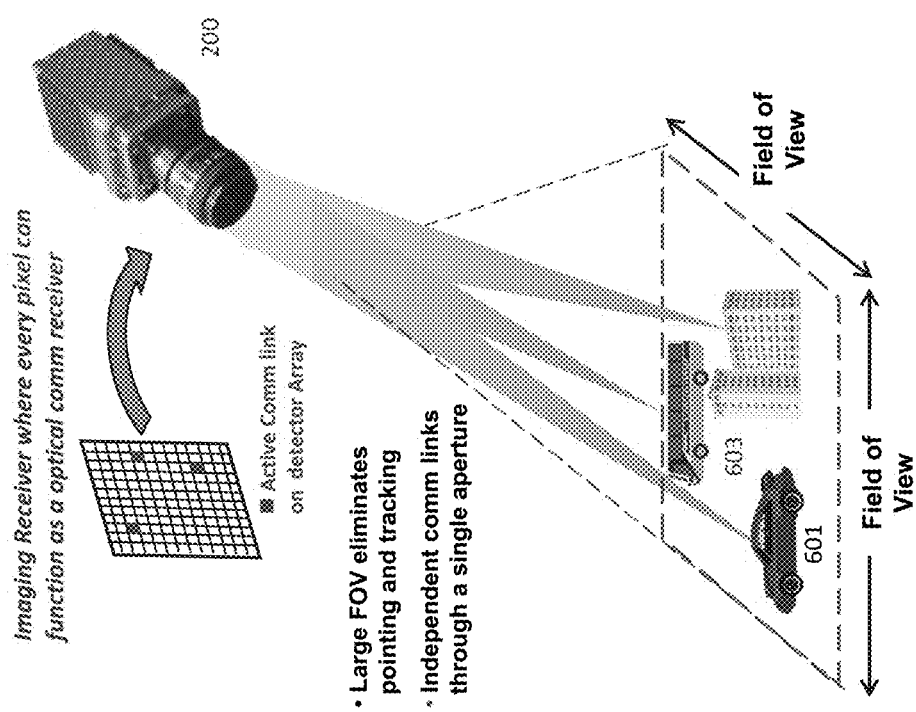
FIG. 6 illustrates multiple, spatially diverse, static or mobile optical sources within the field of view of the DMIR, simultaneously transmitting data to the DMIR via a single receive aperture.

FIG. 6 illustrates how a DMIR camera 200 can be used for simultaneous imaging and communication. In this example, the DMIR camera 200 is on a drone, helicopter, plane, balloon, or satellite (not shown) with the camera field of view represented by the dashed box. It images the area with photon-counting pixels and simultaneously communicates with static or mobile free-space optical transmitters 601 and 603 with photon-timing pixels as explained above. As the transmitters 601 and 603 move, the DMIR camera 200 tracks them by switching pixels into and out of photon-counting mode instead of by more conventional pointing, acquisition, and tracking using a gimbal or other mechanical beam-steering mechanism.

Figure 7:
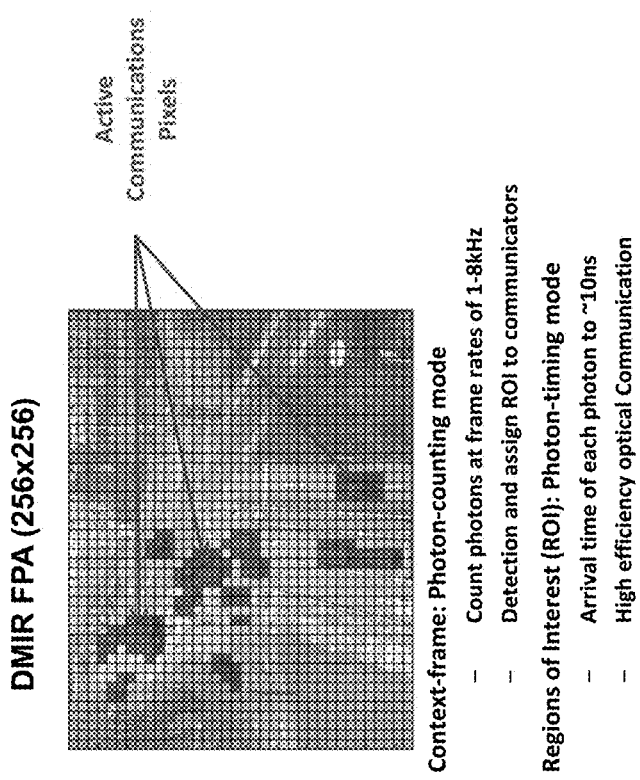
FIG. 7 shows a DMIR providing a context image acquired while detecting, tracking, and demodulating data from several transmitters within the field of view.

FIG. 7 shows as image overlaid with the locations of active communication pixels as collected by a DMIR camera 400. The image provides a context frame that can be updated at a rate of 1-8 kHz using pixels in photon-counting mode. Pixel regions-of-interest in photon-timing mode tag photon arrivals to within 12 ns for high-efficiency, free-space optical communications at MHz rates.

A DMIR can also be used as an optical replacement for WiFi. WiFi is a technology for radio-frequency (RF) wireless local area networking using the IEEE 802.11 standard.

WiFi is a low-cost alternative to installing hardwired connections between computers and devices (e.g., in a computer network). However, while WiFi standards ensure interoperability, they do not ensure available spectrum, nor do they provide any protection against RF signals being intercepted by a third party, thereby jeopardizing security. In concert with an agile beam laser array transmitter (ABLAT), a DMIR enables a bidirectional optical replacement for WiFi, provided a line-of-sight exists between the transmit and receive nodes. The electronic agile beam selection on transmit (e.g., ABLAT) and on receive (DMIR) means that precise pointing and alignment of the optical transceiver is not required. The narrow beams associated with optical transmission provide protection against third-party interception and facilitate use of many such systems in the same local area through space-division multiplexing. Furthermore, there are no spectral allocation issues because the optical band is not regulated and is sufficiently wide to support many more links in a local area than is currently possible with RF technology. As with RF technology, optical orthogonal modulations can be employed to also support multiple users within a single spatial channel.

A DMIR can also be used for long-range communication, including inter-satellite communication links. Currently, constellations of satellites, such as the Iridium constellation, transfer data between satellites using RF cross links. Optical cross links have been considered in the past, but the size, weight and power of the gimbals required to achieve precise pointing with conventional free-space optical communications nodes are prohibitive for satellites. The wide field of view and single-frame acquisition of communication signals afforded by the DMIR enables the use of low-cost gimbals with relatively poor absolute pointing accuracy, since the location of the laser communication signal on the DMIR focal plane provides an angle of arrival for correcting any offset in the gimbal pointing.

A hand-held optical communication link can also benefit from a DMIR at the receiver. Traditionally, an optical communication link requires either fixed pointing and alignment (e.g. building-to-building optical network bridges) or a complex gimbal and control system to track relative motion between transmitter and receiver in order to maintain pointing. The wide field of view of the DMIR, coupled with its fast acquisition and tracking, enables the creation of wireless, gimbal-less, hand-held communication transceivers where the motion artifacts and lack of precision associated with hand-pointing is compensated electronically without the need for mechanical gimbals. Application domains include not only terrestrial links but also undersea links, such as diver-to-diver communications or communication between autonomous underwater vehicles.

Other applications for DMIRs include astronomy and surveillance. As an example, an astronomer may wish to sample the irradiance of certain bright stars at a high time sample rate. Each pixel in the focal plane can independently determine whether or not a bright star is present in the pixel field of view, and the readout logic described in this disclosure can be used to produce the address of the hot pixels and enable sequential readout of the amplitude data in either analog or digital form.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A dual-mode imaging receiver comprising:
a focal plane array comprising an array of photodetectors; and
a read-out integrated circuit operably coupled to the focal plane array, the read-out integrated circuit containing at least one pixel per photodetector in the array of photodetectors,
wherein each pixel in the read-out integrated circuit is independently switchable between a photon-counting mode and a photon-timing mode, and
wherein the read-out integrated circuit is configured to synchronously read pixels in the photon-counting mode and to asynchronously read each pixel in the photon-timing mode.

2. The dual-mode imaging receiver of claim 1, wherein the array of photodetectors is an array of single-photon detectors.

3. The dual-mode imaging receiver of claim 1, further comprising:
a processor, operably coupled to the read-out integrated circuit, to generate an image of a scene based on outputs from the pixels in the photon-counting mode.

4. A dual-mode imaging receiver comprising:
a focal plane array comprising an array of photodetectors;
a read-out integrated circuit operably coupled to the focal plane array, the read-out integrated circuit containing at least one pixel per photodetector in the array of photodetectors,
wherein each pixel in the read-out integrated circuit is independently switchable between a photon-counting mode and a photon-timing mode,
wherein each pixel in the read-out integrated circuit comprises a counter to count photons in the photon-counting mode and to track photon arrivals in the photon-timing mode, and
wherein the counter is an up/down counter and the read-out integrated circuit is configured to modulate a counting direction of the up/down counter with an up/down modulation signal based on a time-domain structure of a communication waveform detected by the pixel.

5. The dual-mode imaging receiver of claim 4, wherein the read-out integrated circuit is configured to vary a relative phase between the up/down modulation signal and the communication waveform.

6. A dual-mode imaging receiver comprising:
a focal plane array comprising an array of photodetectors;
a read-out integrated circuit operably coupled to the focal plane array, the read-out integrated circuit containing at least one pixel per photodetector in the array of photodetectors, wherein each pixel in the read-out integrated circuit is independently switchable between a photon-counting mode and a photon-timing mode;
a first clock, operably coupled to the read-out integrated circuit, to clock read-out of each pixel in the photon-counting mode at a first rate; and
a second clock, operably coupled to the read-out integrated circuit, to clock each pixel in the photon-timing mode at a second rate greater than the first rate.

7. The dual-mode imaging receiver of claim 6, wherein the first rate is from 1 kHz to 10 kHz and the second rate is from 100 kHz to 10 MHz.

8. A method of imaging and communicating with a dual-mode imaging receiver comprising a focal plane array comprising an array of photodetectors and a read-out integrated circuit containing at least one pixel per photodetector in the array of photodetectors, the method comprising:
detecting photons with a first photodetector in the array of photodetectors;
counting the photons detected by the first photodetector with a first pixel in the read-out integrated circuit;
detecting photons with a second photodetector in the array of photodetectors; and
timing arrivals of the photons detected by the second photodetector with a second pixel in the read-out integrated circuit while the first pixel counts the photons detected by the first photodetector, the arrivals representing a communications signal.

9. The method of claim 8, further comprising:
receiving the photons detected by the first photodetector and the photons detected by the second photodetector via the same aperture.

10. The method of claim 8, further comprising:
switching the first pixel from photon-counting mode to photon-timing mode independent of a mode of the second pixel.

11. The method of claim 8, wherein timing arrivals of the photons comprises incrementing a count in an up/down counter in the second pixel.

12. The method of claim 11, further comprising:
modulating a counting direction of the up/down counter with an up/down modulation signal based on a time-domain structure of a communication waveform detected by the second pixel.

13. The method of claim 12, further comprising:
varying a relative phase between the up/down modulation signal and the communication waveform.

14. The method of claim 8, further comprising:
synchronously reading a counter in the first pixel; and
asynchronously reading a counter in the second pixel.

15. The method of claim 14, further comprising:
clocking read-out of the first pixel at a first rate; and
clocking the second pixel at a second rate greater than the first rate.

16. The method of claim 15, wherein the first rate is from 1 kHz to 10 kHz and the second rate is from 100 kHz to 10 MHz.

17. The method of claim 8, further comprising:
generating an image of a scene based on the outputs from the pixels in the photon-counting mode.

18. The method of claim 8, wherein the communications signal is a first communications signal, and further comprising:
detecting photons with a third photodetector in the array of photodetectors; and
timing arrivals of the photons detected by the third photodetector with a third pixel in the read-out integrated circuit while the first pixel counts the photons detected by the first photodetector and the second pixel times arrivals of the photons detected by the second photodetector, the arrivals timed by the third photodetector representing a second communications signal.

* * * * *